United States Patent [19]
Weining et al.

[11] Patent Number: 5,651,339
[45] Date of Patent: Jul. 29, 1997

[54] DEFLECTOR STRUCTURE FOR AN INTAKE AIR DUCT OF AN INTERNAL COMBUSTION ENGINE

[75] Inventors: Hans Karl Weining; Axel Wüst, both of Esslingen; Berndt Schütz, Stuttgart; Peter Dittrich, Stuttgart; Wolf Dieter Wagner, Stuttgart; Claus Peter Höptner, Uhingen, all of Germany

[73] Assignee: Mercedes-Benz AG, Stuttgart, Germany

[21] Appl. No.: 676,465

[22] Filed: Jul. 8, 1996

[30] Foreign Application Priority Data

Jul. 10, 1995 [DE] Germany ............... 195 25 086.9

[51] Int. Cl.⁶ ............................................. F02M 29/04
[52] U.S. Cl. ............................................... 123/184.53
[58] Field of Search ................. 123/184.53, 184.57, 123/184.21, 184.61

[56] References Cited

U.S. PATENT DOCUMENTS

| | | | |
|---|---|---|---|
| 3,983,853 | 10/1976 | Gospodar et al. | 123/184.53 |
| 4,704,996 | 11/1987 | Morikawa | 123/184.53 |
| 4,907,547 | 3/1990 | Daly | 123/184.61 |
| 5,273,010 | 12/1993 | Elder | 123/184.21 |
| 5,572,966 | 11/1996 | Doddy et al. | 123/184.57 |

FOREIGN PATENT DOCUMENTS

| | | |
|---|---|---|
| 38 43 019 | 6/1990 | Germany. |
| 40 31 886 | 5/1991 | Germany. |
| 44 39 792 | 5/1992 | Germany. |

OTHER PUBLICATIONS

W. Beitz et al., *Taschenbuch Für Den Maschinenbau*, 17, 1990.

*Primary Examiner*—Marguerite McMahon
*Attorney, Agent, or Firm*—Klaus J. Bach

[57] ABSTRACT

In a flow deflector structure for an intake air duct of an internal combustion engine which includes a housing with air inlet and outlet openings arranged at a predetermined angle with respect to each other for redirecting air flowing through the deflector structure and with flow guide vanes curved according to the flow direction change provided by the flow deflector structure, the housing has a flow cross-section which is larger than the flow cross-section of the inlet and outlet openings and a side wall opening with a cover to facilitate forming, or insertion of the guide vanes in the housing.

5 Claims, 4 Drawing Sheets

5,651,339

DEFLECTOR STRUCTURE FOR AN INTAKE AIR DUCT OF AN INTERNAL COMBUSTION ENGINE

BACKGROUND OF THE INVENTION

The invention relates to a deflector structure for an intake air duct of an internal combustion engine with essentially annular inlet and outlet sections and a deflector housing portion disposed between the inlet and outlet sections.

In gas ducts, particularly air ducts for internal combustion engines, in which the air is deflected by a large angle, the flow profile becomes generally disturbed by turbulence, still areas and return flow areas. With such disturbances in the flow pattern, the flow resistance is increased and, consequently, the effective cross-section of the air duct is reduced.

It is generally known (see Dubbel, "Taschenbuch für den Maschinenbau", 17$^{th}$ edition, page 50 (Mechanical Engineering Handbook)) to provide in such duct areas guide baffles for deflecting the air. But even with guide baffles, there are still flow losses.

An arrangement for guiding the air into an intake duct of an internal combustion engine is disclosed in DE 38 43 019 C2. Here, guide baffles are provided in an air inlet housing for leading the air from the housing into a coaxial air outlet.

DE 44 39 792 A1 discloses an air inlet system for internal combustion engines with an air inlet section and a suction pipe section with several suction pipes for conducting the air to the respective cylinders of the engine. There are further at least first and second air flow chambers which interconnect the air inlet section with the suction pipe section. The sections are arranged side-by-side and the intake air passes through the sections in succession. The sections are divided by a common wall and are in communication with one another by an opening in the common wall.

DE 40 31 886 A1 discloses a suction pipe for an internal combustion engine providing for communication between an intake of a cylinder of the internal combustion engine and an air collector or the surrounding air which includes a nozzle structure. In order to achieve a high air delivery rate also during low revolution operation of the engine with such a suction pipe, the suction pipe's inlet end has a suction funnel. The diffuser has an increased diameter end to which the inlet of a nozzle is joined which leads to the suction channel of the cylinder head of the internal combustion engine and has an opening corresponding to the flange diameter of the suction channel.

It is the object of the present invention to provide an intake air duct for an internal combustion engine which provides for a guided air flow with optimal flow profile.

SUMMARY OF THE INVENTION

In a flow deflector structure for an intake air duct of an internal combustion engine which includes a housing with air inlet and outlet openings arranged at a predetermined angle with respect to each other for redirecting air flowing through the deflector structure and with flow guide vanes curved according to the flow direction change provided by the flow deflector structure, the housing has a flow cross-section which is larger than the flow cross-section of the inlet and outlet openings and a side wall opening with a cover to facilitate forming, or insertion of, the guide vanes in the housing.

Because of the increased cross-section of the flow deflector structure, the flow guide vanes do not represent flow restrictions which would also generate flow losses by reducing the flow cross-section. Losses are avoided since the increased cross-section more than compensates for the area lost to the flow guide structures. Further, the arrangement is such that the flow guide structures can easily be integrated into the deflector structure.

However, the guide vanes cannot be installed in the manner commonly employed because of the increased flow cross-section in the area of the deflector structure. Thus the deflector structure is a two-part structure with a removable side portion covering an opening through which guide vanes which extend over the full flow cross-section can be inserted or can be formed.

With the guide vane arrangement according to the invention, the air flow losses are substantially reduced and air is supplied from the air filter to the internal combustion engine efficiently under optimal air flow conditions.

The invention will be described in greater detail on the basis of the accompanying drawings.

DESCRIPTION OF THE PREFERRED EMBODIMENT

Figure 1:
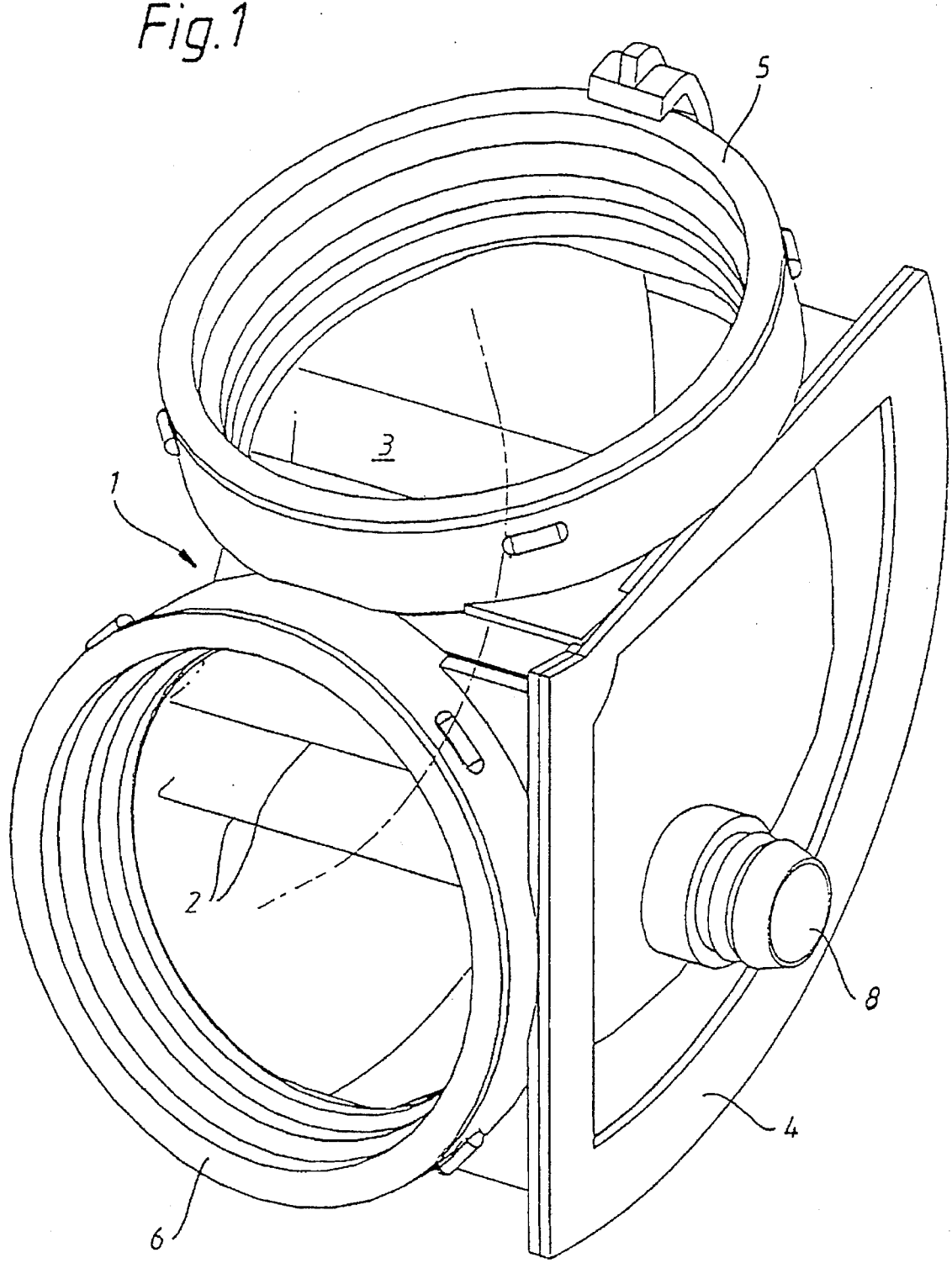
FIG. 1 is a perspective view of an air deflector structure according to the invention.

An intake air duct for an internal combustion engine includes a deflector structure 1 as shown in FIG. 1 which is provided with air flow guide vanes 2. The curvature of the guide vanes is adapted to the flow direction change provided by the deflector structure 1. The guide vanes 2 may be uniform thickness or they may be streamlined.

Figure 4:
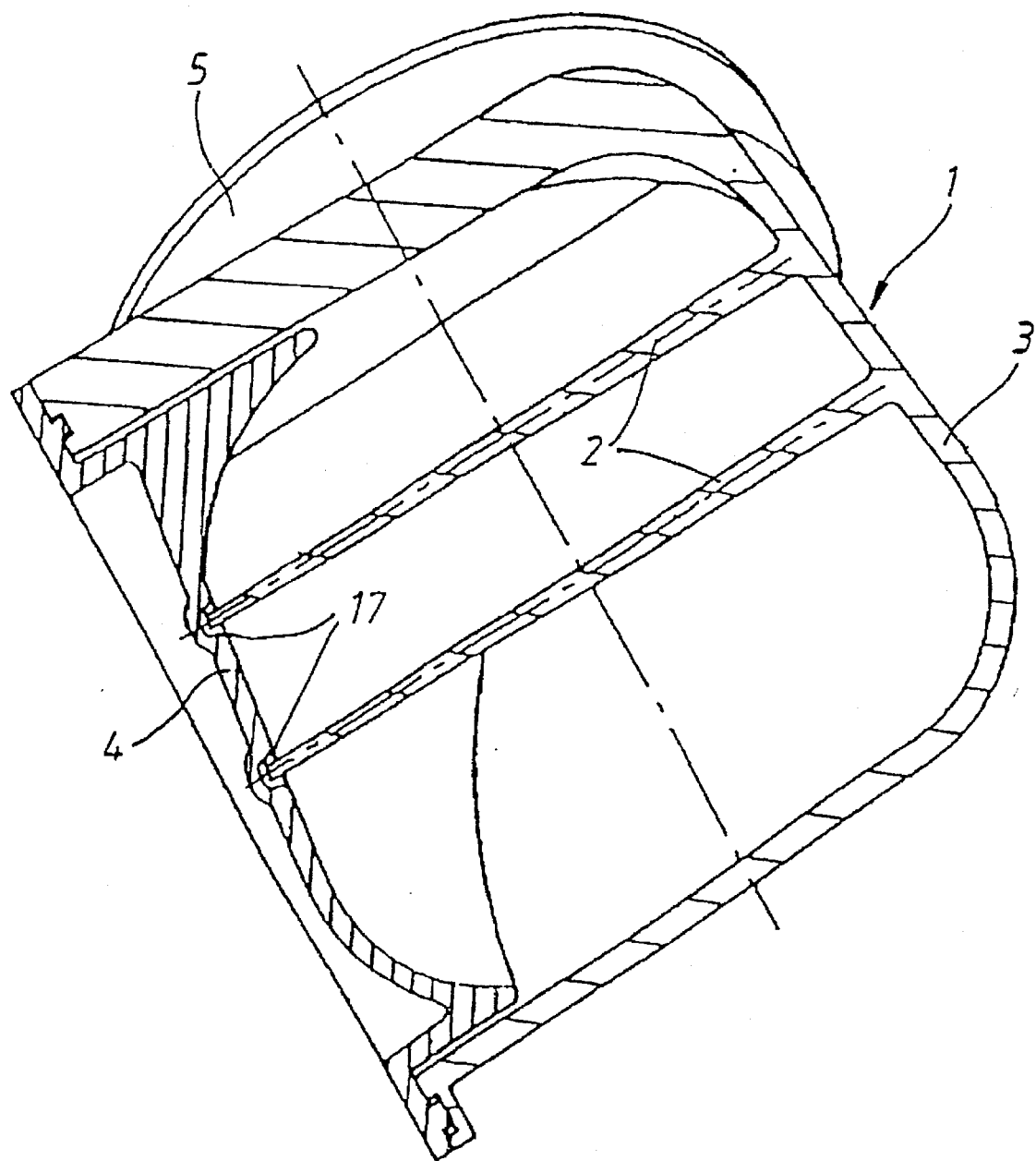
FIG. 4 is a cross-sectional view of an embodiment wherein the flow guide vanes are formed integrally with the deflector housing.

As shown in FIG. 4, the cross-section of the deflector structure 1 is not circular like that of the inlet 5 and the outlet 6, but the deflector structure 1 is widened transverse to the flow direction so that the flow cross-section within the deflector structure is increased. This increased flow cross-section as clearly shown in the lower part of FIG. 4, markedly reduces the flow losses and improves the flow profile. It more than compensates for the volume taken up by the flow guide vanes 2 so that the flow cross section is not detrimentally affected by the installation of the guide vanes.

Figure 2:
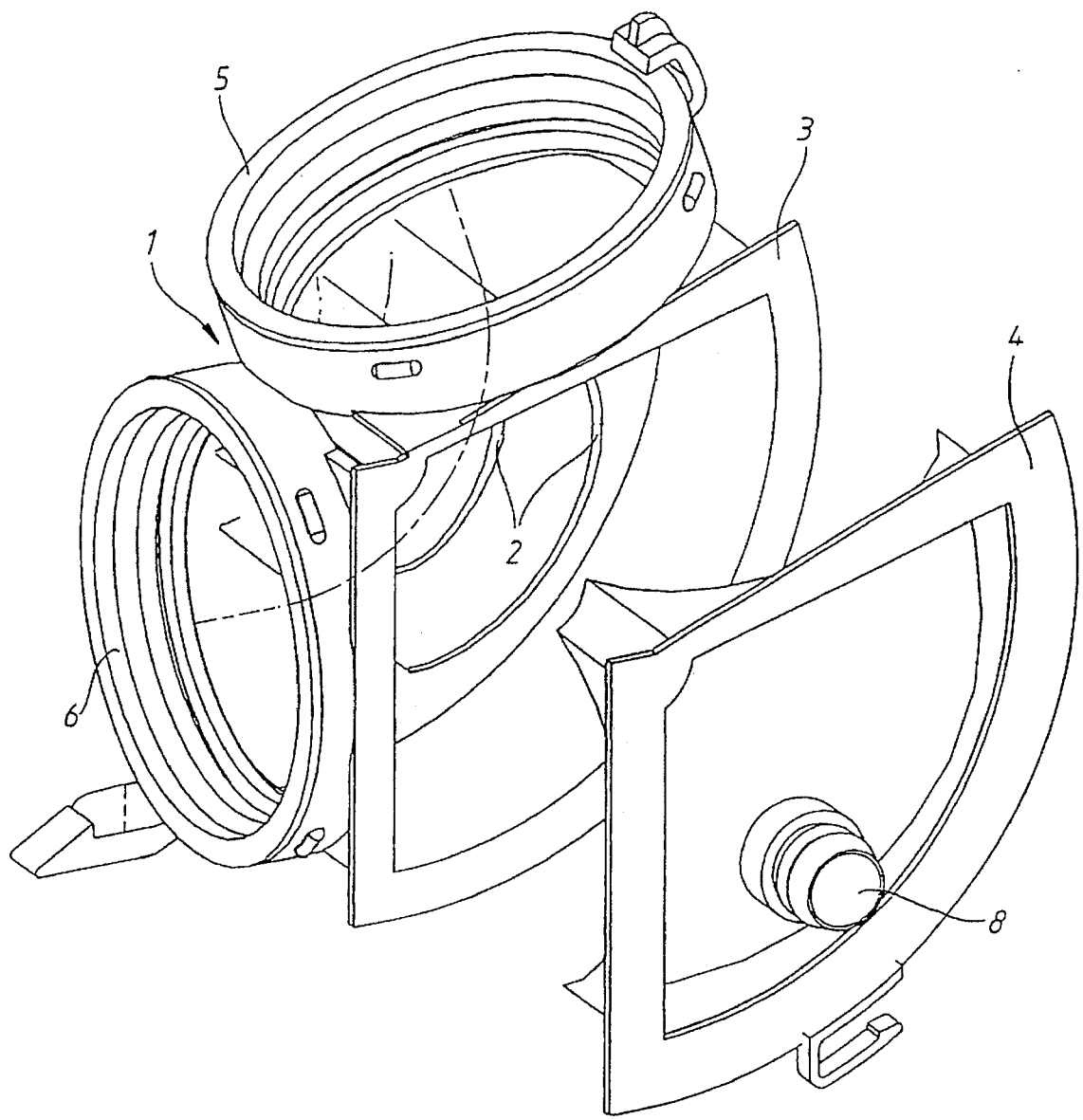
FIG. 2 is a perspective view of the air deflector structure with the cover shown removed.

The deflector structure 1 is formed as a two-part structure. It comprises a housing part 3 with an opening at one side which is closed by a cover 4. FIG. 2 shows the deflector housing 3 with the cover 4 removed. As can be seen from FIG. 2, the housing 3 includes an inlet portion 5 and an outlet portion 6. The air coming from an air filter enters the deflector housing 1 through the inlet portion 5. After the air entering through the inlet portion 5 has been deflected by the deflector housing walls and the guide vanes 2, it leaves the deflector housing 1 through the outlet portion 6 in the direction toward the internal combustion engine.

Figure 3:
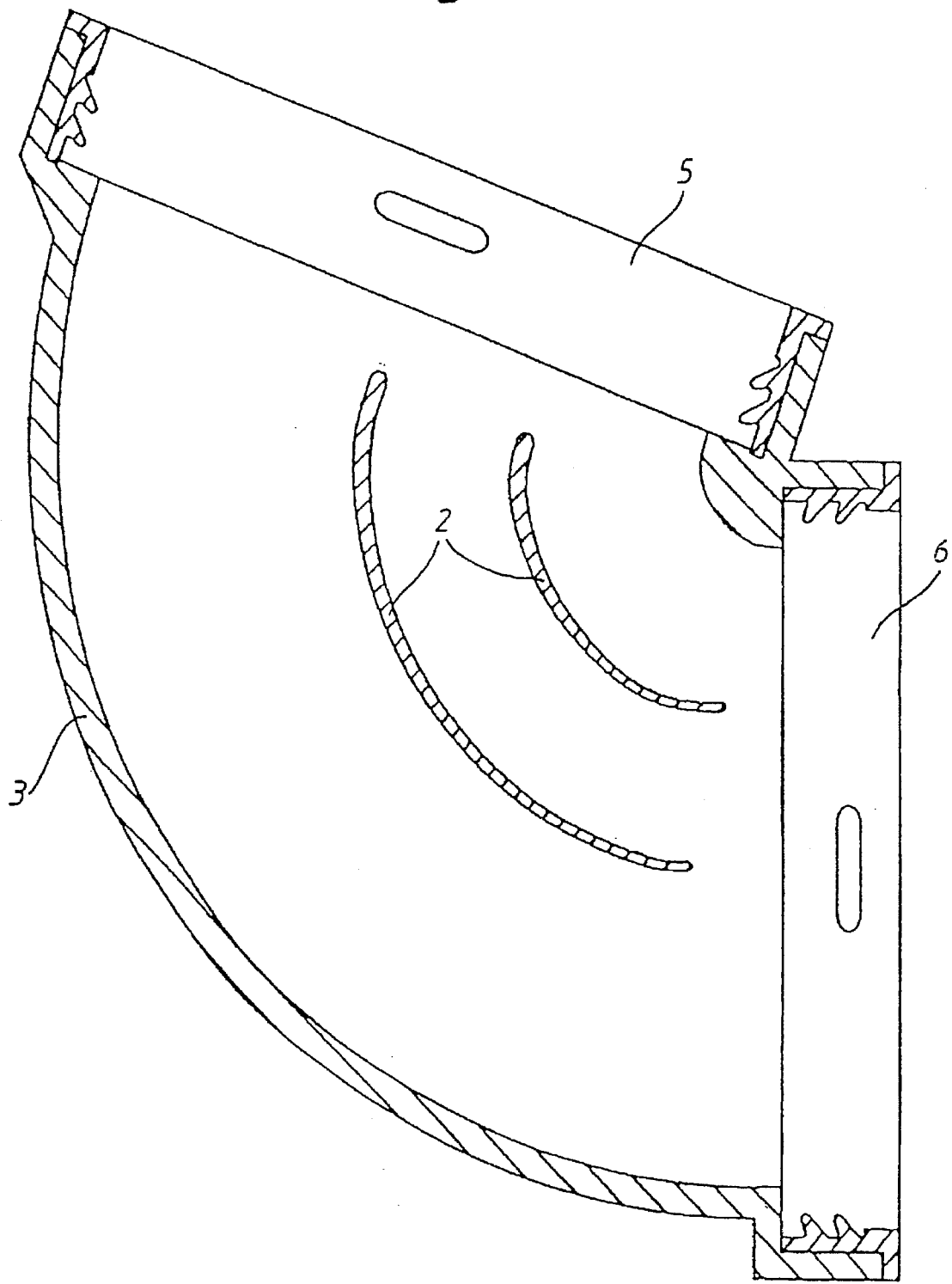
FIG. 3 is a longitudinal cross-sectional view of the deflector structure.

As shown in FIGS. 2 and 4, the guide vanes 2 are formed integrally with the deflector housing 1. FIG. 3 shows the deflector housing with the guide vanes arranged therein. As shown in FIG. 4, the guide vanes 2 which are integrally formed with, and project from, one side wall of the deflector housing 1 have their free ends received in grooves 17 formed in the inner wall of the cover 4 opposite the side wall of the deflector housing from which the guide vanes 2 project. The grooves 17 have a width corresponding to the thickness of the free ends of the guide vanes 2 so that the free ends of the guide vanes are snugly received and firmly supported in the grooves 17 so as to stabilize the guide vanes 2. Preferably, the guide vanes 2 are formed integrally with the deflector housing 1 which consists of plastic and is formed by injection molding or casting.

The housing part 3 is sealingly closed by the cover 4. The air-tight mounting of the cover 4 on the housing assists in optimizing the air flow through the deflector housing 1. The air-tight connection can be achieved by welding, soldering, bonding, or bolting the cover 4 onto the housing 3.

As shown in FIGS. 1 and 2, the cover 4 includes a nozzle stub 8 for the admission of additional air. If needed, the stub 8 can be used for connection of the crankcase ventilation system, for example.

Since the deflector structure consists of housing part 3 with a cover 4, it is possible to make the inlet part 5 and the outlet part 6 free of any burrs. The inlet part 5 and the outlet part 6 are therefore smoothly connected to the housing part 3.

Since neither the inlet part 5 nor the outlet part 6 have any burrs, good seals can be obtained and the flow profile is optimal providing for little flow losses.

It is of course, possible to form the guide vanes 2 integrally with the cover 4 and to provide the grooves for supporting the free ends of the guide vanes 2 in the housing part 3.

What is claimed is:

1. A flow deflector structure for an intake air duct of an internal combustion engine comprising:

a housing with an air inlet portion and an air outlet portion having essentially circular inlet and outlet openings, respectively, said inlet and outlet portions being arranged at a predetermined angle with respect to one another for redirecting air flowing through said deflector structure, at least one flow guide vane disposed in said housing and having a curvature adapted to the air flow direction change to be provided by said deflector structure, said housing having a flow cross-section different in shape from the essentially circular shape of the inlet and outlet openings such that the flow cross-section in said housing part is larger than that of said inlet and outlet openings, said housing having an integral side wall and, opposite said integral side wall, a side opening and a cover disposed in and closing said side opening.

2. A flow deflector structure according to claim 1, wherein said inlet part and said outlet part are integrally formed with said housing.

3. A flow deflector structure according to claim 1, wherein said housing includes at least two flow guide vanes, said flow guide being streamlined and having a cross-section which uniformly decreases in flow direction.

4. A flow deflector structure according to claim 1, wherein said flow guide vanes are integrally formed with one of said housing and said cover and have free ends supported in grooves formed in the other of said housing and said cover.

5. A flow deflector structure according to claim 4, wherein said grooves have a width corresponding to the thickness of the free ends of said flow guide vanes for snugly receiving and firmly supporting the free ends of said flow guide vanes.

* * * * *